(12) United States Patent
Zhan et al.

(10) Patent No.: US 7,982,962 B2
(45) Date of Patent: Jul. 19, 2011

(54) LENS MODULE OF SCANNER

(75) Inventors: Wei-Chen Zhan, Taichung (TW); Jian-Wei Lee, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 12/877,601

(22) Filed: Sep. 8, 2010

(65) Prior Publication Data

US 2011/0058264 A1    Mar. 10, 2011

(30) Foreign Application Priority Data

Sep. 9, 2009  (TW) .............................. 98130375 A

(51) Int. Cl.
*G02B 3/00*    (2006.01)
*G02B 26/10*    (2006.01)
*G02B 13/18*    (2006.01)
*G02B 9/34*    (2006.01)

(52) U.S. Cl. ......... 359/662; 359/206; 359/715; 359/773
(58) Field of Classification Search .................. 359/206, 359/662, 715, 773
See application file for complete search history.

(56) References Cited

U.S. PATENT DOCUMENTS

2010/0165484 A1 *   7/2010   Yin et al. ..................... 359/715
* cited by examiner

*Primary Examiner* — Scott J Sugarman
(74) *Attorney, Agent, or Firm* — Thomas|Kayden

(57) ABSTRACT

A lens module of a scanner is provided, including a first lens with a positive diopter, a second lens with a negative diopter, a third lens with a positive diopter, and a fourth lens with a negative diopter. The first, second, third, and fourth lenses are sequentially arranged from an object end to an image end of the lens module, and at least one of the first and fourth lenses is an aspheric lens. The fourth lens has a focal length f4 and an objective side surface with a radius of curvature R7, wherein $0.1 < R7/f4 < 1$.

5 Claims, 8 Drawing Sheets

US 7,982,962 B2

LENS MODULE OF SCANNER

CROSS REFERENCE TO RELATED APPLICATIONS

This Application claims priority of Taiwan Patent Application No. 098130375, filed on Sep. 9, 2009, the entirety of which is incorporated by reference herein.

BACKGROUND OF THE INVENTION

1. Field of the Invention

This application relates in general to an optical device and in particular to a lens module of a scanner.

2. Description of the Related Art

Operation of a camera scanner is more efficient than that of a conventional contact type scanner which reads images line-by-line. Referring to FIG. 1, a conventional camera scanner 1 comprises a housing 11, a lens module 12 disposed in the housing 11, and a light source 13. Light is emitted from the light source 13 to a document 14 and into the housing 11. Subsequently, light is reflected by several mirrors 15 to the lens module 12, thus projecting an image in the lens module 12.

Referring to FIG. 2, the viewing angle $\theta_0$ of the camera scanner 1 is about 40 degrees. Because the lens module 12 requires greater focal length to provide adequate viewing angles, dimensions of the camera scanner 1 must be large. To facilitate miniaturization of the camera scanner 1, adequate viewing angles of the lens module 12 must be achieved without large dimensions of the camera scanner 1.

BRIEF SUMMARY OF INVENTION

The application provides a lens module of a scanner, including a first lens with a positive diopter, a second lens with a negative diopter, a third lens with a positive diopter, and a fourth lens with a negative diopter. The first, second, third, and fourth lenses are sequentially arranged from an object end to an image end of the lens module, and at least one of the first and fourth lenses is an aspheric lens. The fourth lens has a focal length f4 and an objective side surface with a radius of curvature R7, wherein $0.1 < R7/f < 1$.

BRIEF DESCRIPTION OF DRAWINGS

The invention can be more fully understood by reading the subsequent detailed description and examples with references made to the accompanying drawings, wherein.

DETAILED DESCRIPTION OF INVENTION

First Embodiment

Figure 1:
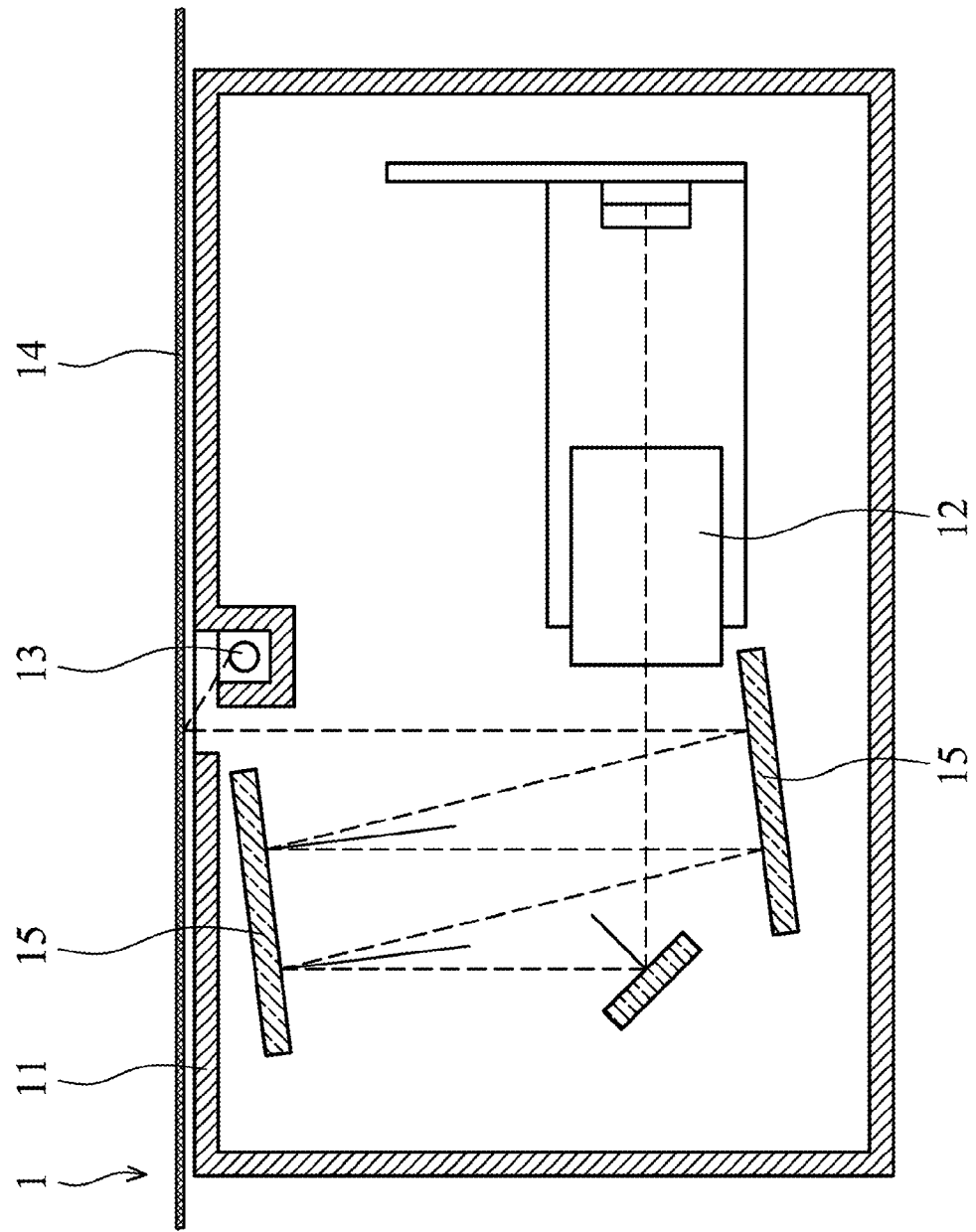
FIG. 1 is a sectional view of a conventional camera scanner.
Figure 2:
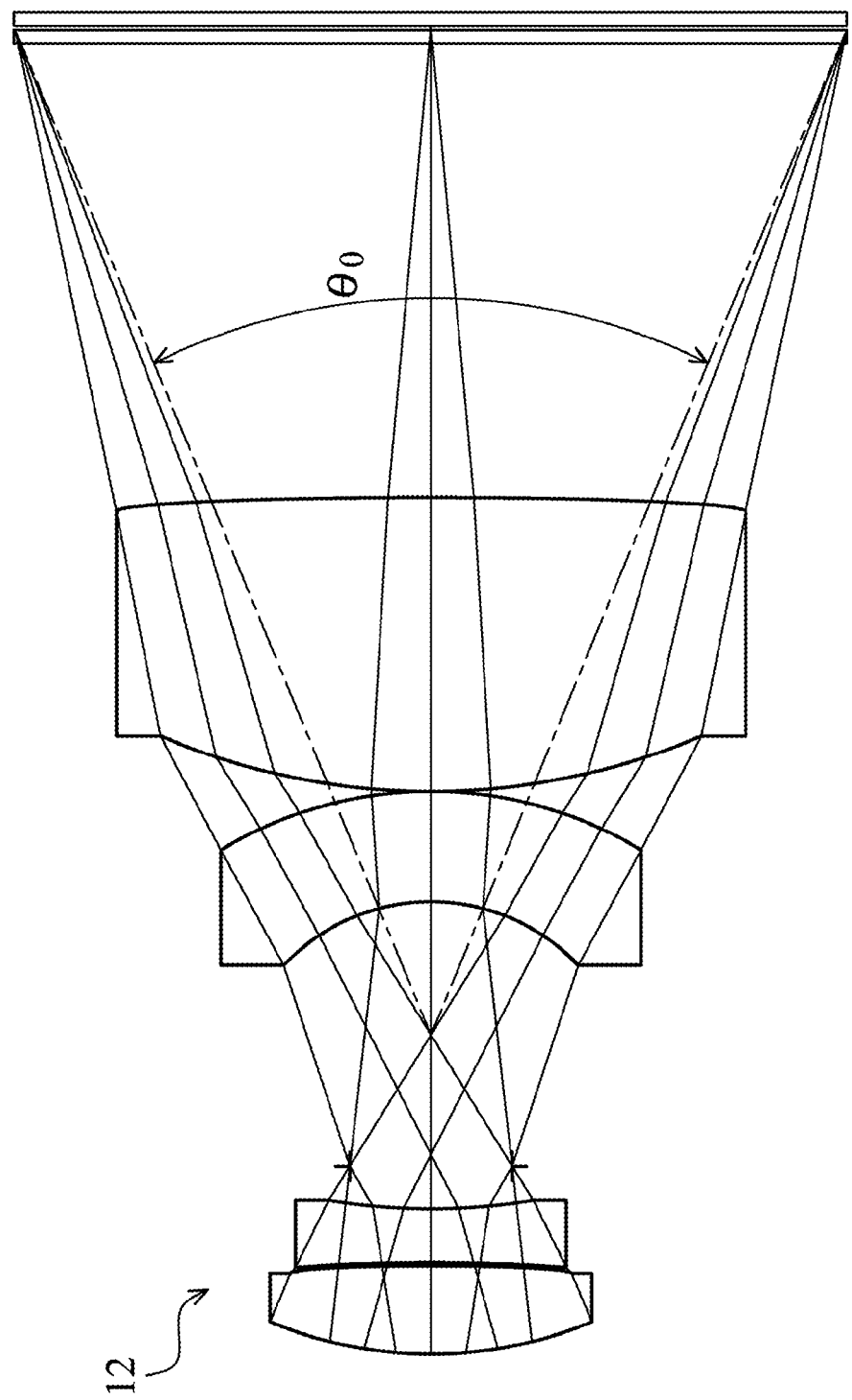
FIG. 2 is a perspective diagram of a conventional lens module of a scanner.
Figure 3:
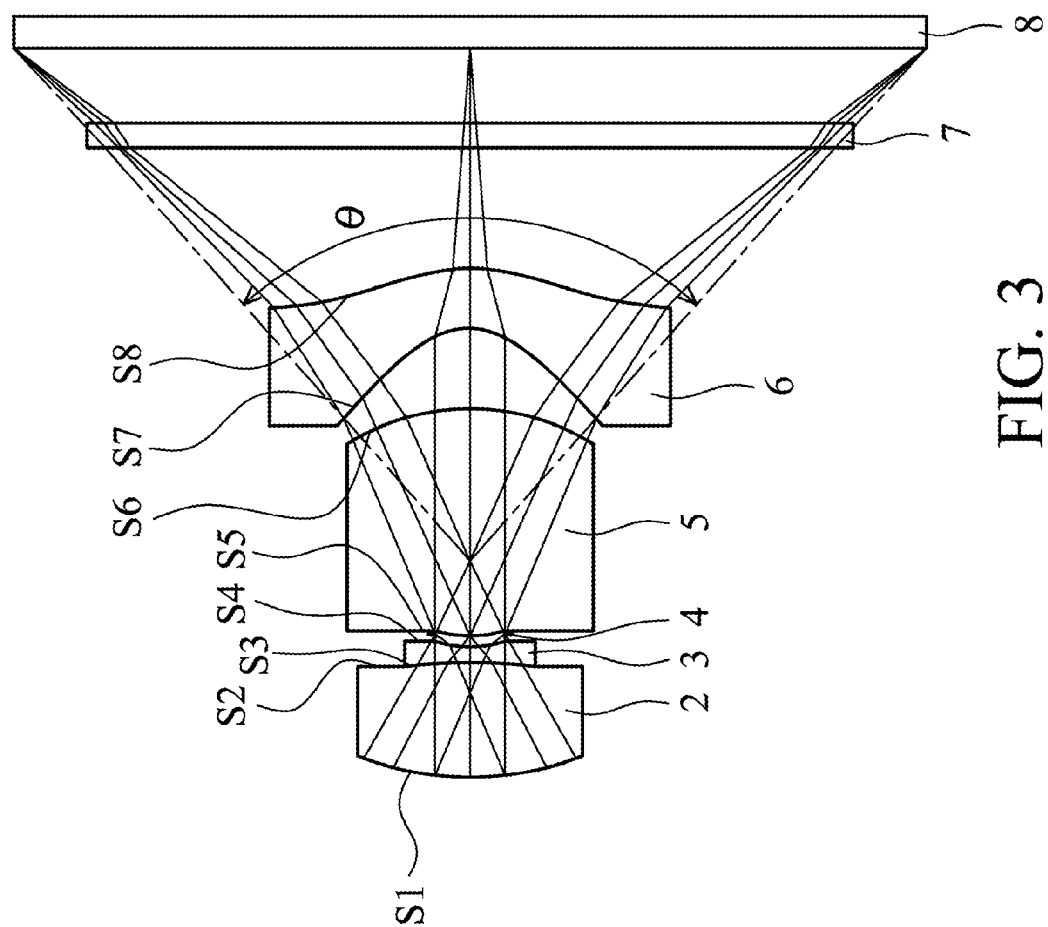
FIG. 3 is a perspective diagram of a lens module of a scanner according to a first embodiment of the invention.

FIG. 3 illustrates a lens module of a scanner according to a first embodiment of the invention. The lens module comprises a first lens 2, a second lens 3, an aperture stop 4, a third lens 5, and a fourth lens 6 sequentially arranged from an object end to an image end. Light passes through the lens module and a cover glass 7 to an image sensor 8 (such as CCD or CMOS), thus capturing images of an object.

In this embodiment, the diopter values of the first and third lenses 2 and 5 are positive, and the diopter values of the second and fourth lenses 3 and 6 are negative to reduce axial chromatic aberration. The first lens 2 is a biconvex glass lens providing main refraction for image formation. The second lens 3 is a biconcave spherical glass lens, and the third lens 5 is a biconvex spherical glass lens to reduce chromatic aberration. The aperture stop 4 is disposed between the second and third lenses 3 and 5, as a middle diaphragm to increase the viewing angle $\theta$. The fourth lens 6 is a negative meniscus glass lens to increase the viewing angle $\theta$ and correct field curvature and coma aberration. The first, second, third, fourth lenses 2, 3, 5, 6 and the aperture stop 4 are arranged with a lower limited viewing angle of 80 degrees. The fourth lens 6 satisfies the following condition (1):

$$0.1 < R7/f4 < 1 \quad (1)$$

In the condition (1), R7 is the radius of curvature of the object side surface S7 of the fourth lens 6, and f4 is the focal length of the fourth lens 6. When the radius of curvature R7 exceeds the focal length f4 of the fourth lens 6 (R7/f4>1), chromatic aberration may adversely occur. When the focal length f4 is much less than the radius of curvature f4 (R7/f4<0.1), obvious chromatic aberration may occur.

Additionally, the lens module of the scanner satisfies the following condition (2):

$$0.2 < f1/f < 1 \quad (2)$$

In the condition (2), f1 is the focal length of the first lens 2, and f is the system focal length of the lenses module of the scanner. When the focal length f1 exceeds the system focal length f (f1/f>1), the positive diopter value of the first lens 2 is inadequate and results in a long total track length (TTL) of the lens module. When the focal length f1 is much less than the system focal length f (f1/f<0.2), obvious chromatic aberration may occur.

The aspheric surface can be described by the following equation:

$$z = \frac{ch^2}{1 + [1 - (k+1)c^2h^2]^{\frac{1}{2}}} + Ah^4 + Bh^6 + Ch^8 + Dh^{10} + Eh^{12} + Fh^{14} + Gh^{16}$$

With respect to the equation, h is the coordinate along the optical axis from an apex of the aspheric surface, z is the vertical distance to the optical axis, k is the conic coefficient, c is the inverse of the radius of curvature, and A-G are aspheric coefficients. The aspheric lenses can have better imaging quality than the spherical lenses. Additionally, since traditional spherical lenses need a large space for accommodating hybrid lenses, total track length thereof is inevitably increased. With the first, second, third, and fourth lenses 2, 3, 5, and 6 satisfying the conditions (1) and (2), the viewing angle θ and clarity of images are efficiently improved.

Table 1-1 illustrates the design data of the lens module of a scanner in accordance with FIG. 3:

TABLE 1-1

| Surface | Radius of curvature (mm) | Thickness (mm) | Refraction index (Nd) | Abbe number (vd) |
|---|---|---|---|---|
| S1 | 0.641967 | 0.221381 | 1.6691 | 55.4183 |
| S2 | −1.9732 | 0.002621 | | |
| S3 | −1.23195 | 0.039738 | 1.6477 | 33.7928 |
| S4 | 0.638318 | 0.025963 | | |
| Aperture stop | | 0.002928 | | |
| S5 | 0.909516 | 0.447511 | 1.7725 | 49.5984 |
| S6 | −0.50172 | 0.171396 | | |
| S7 | −0.16431 | 0.12125 | 1.5481 | 45.7843 |
| S8 | −0.3968 | 0.248175 | | |

As shown in FIG. 3, the lens surfaces S1-S8 are sequentially positioned from an object end to an image end of the lens module. In this embodiment, the lens module has a system focal length f=1 mm, the first lens 2 has a focal length f1=0.7453 mm, the fourth lens 6 has a focal length f4=−0.6239 mm, and the objective side surface S7 has a radius of curvature R7=−0.16431 mm, satisfying the conditions (1) and (2), wherein the viewing angle θ is 82.9 degrees.

Figure 4B:
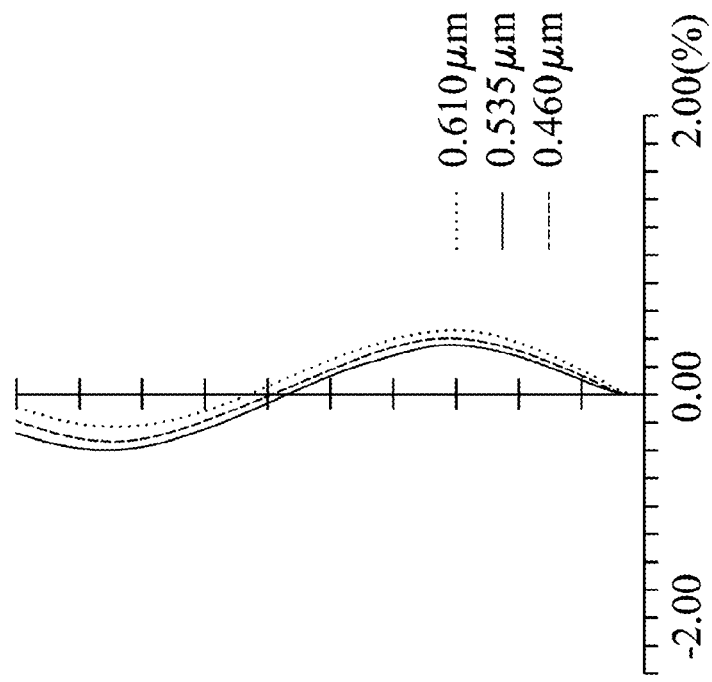
FIGS. 4A-4D are curvature of image field, distortion, MTF, and through-focus MTF plots according to the first embodiment of the invention.
Figure 4A:
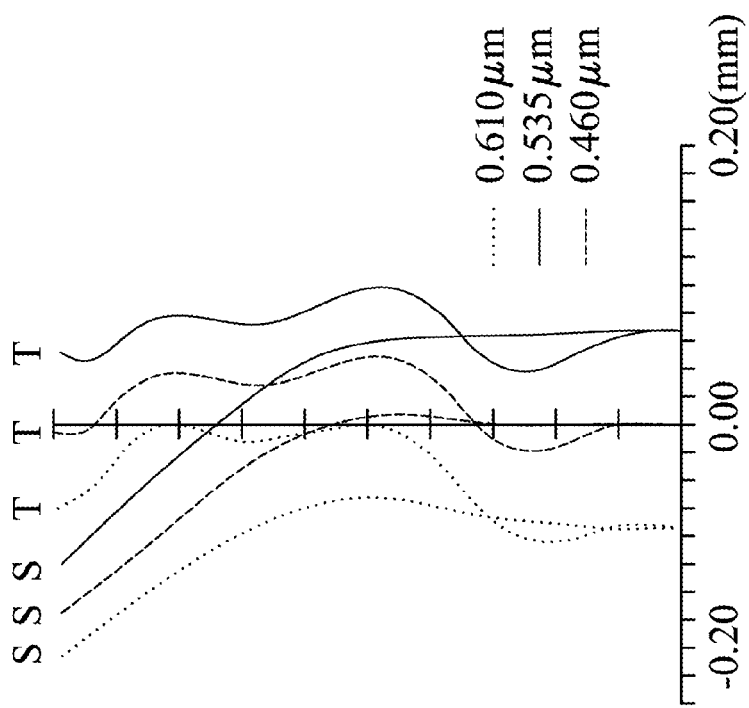

Table 1-2 illustrates the design data of the first and fourth aspheric lenses 2 and 6 in accordance with FIG. 3:

Referring to FIG. 4A, T and S respectively represents curvature of image field of the meridional plane and the sagittal plane at different heights, wherein the horizontal axis represents aberration from the imaging point to the ideal image, and the vertical axis represents ideal height of the image. FIG. 4B illustrates distortion with horizontal magnification, wherein the horizontal axis represents aberration in percentage, and the vertical axis represents ideal height of the image. As shown in FIGS. 4A and 4B, distortion and curvature of the image field are not serious.

Figure 4C:
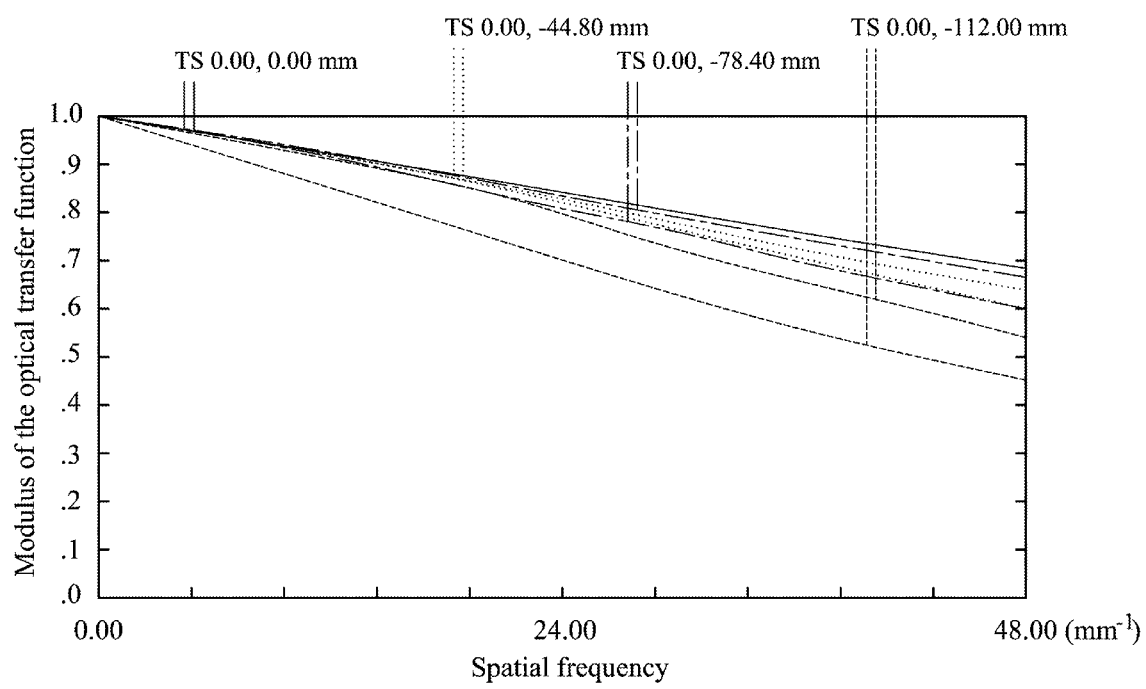
Figure 4D:
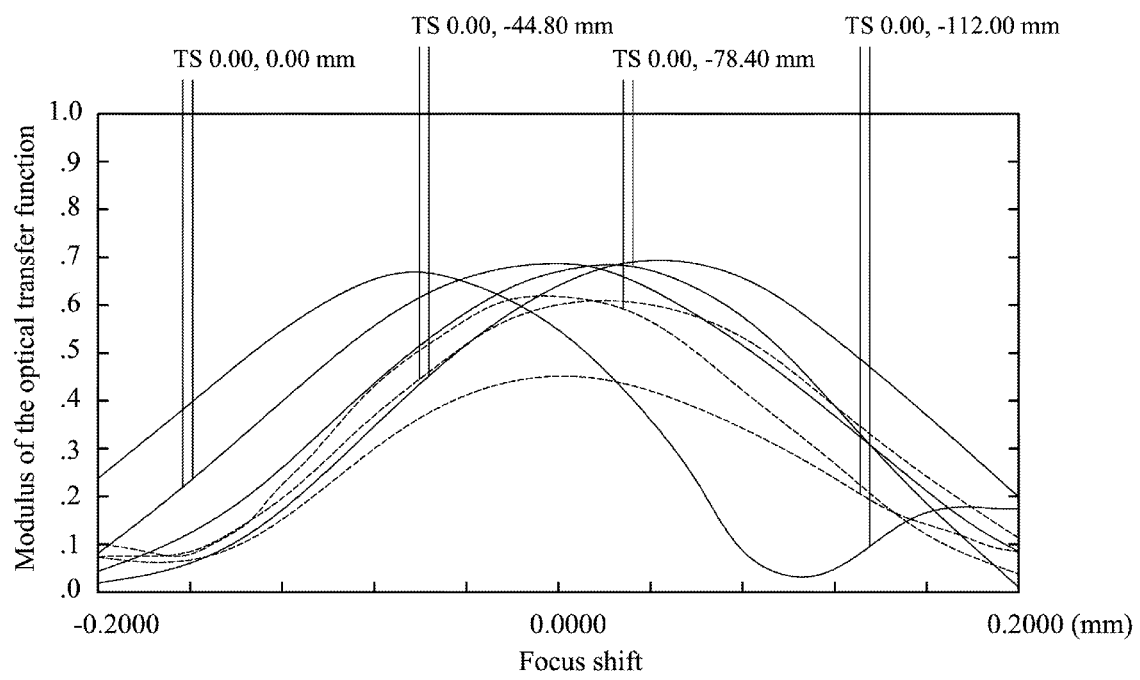

FIG. 4C is a modulation transfer function (MTF) diagram which illustrates modulus of the optical transfer function (OTF) response to spatial frequency. FIG. 4D is a through-focus MTF plot showing relationship of the modulus of the optical transfer function (OTF) to the focus shift. As shown in FIGS. 4A and 4D, the lens module in this embodiment can have high optical resolution.

Second Embodiment

Figure 5:
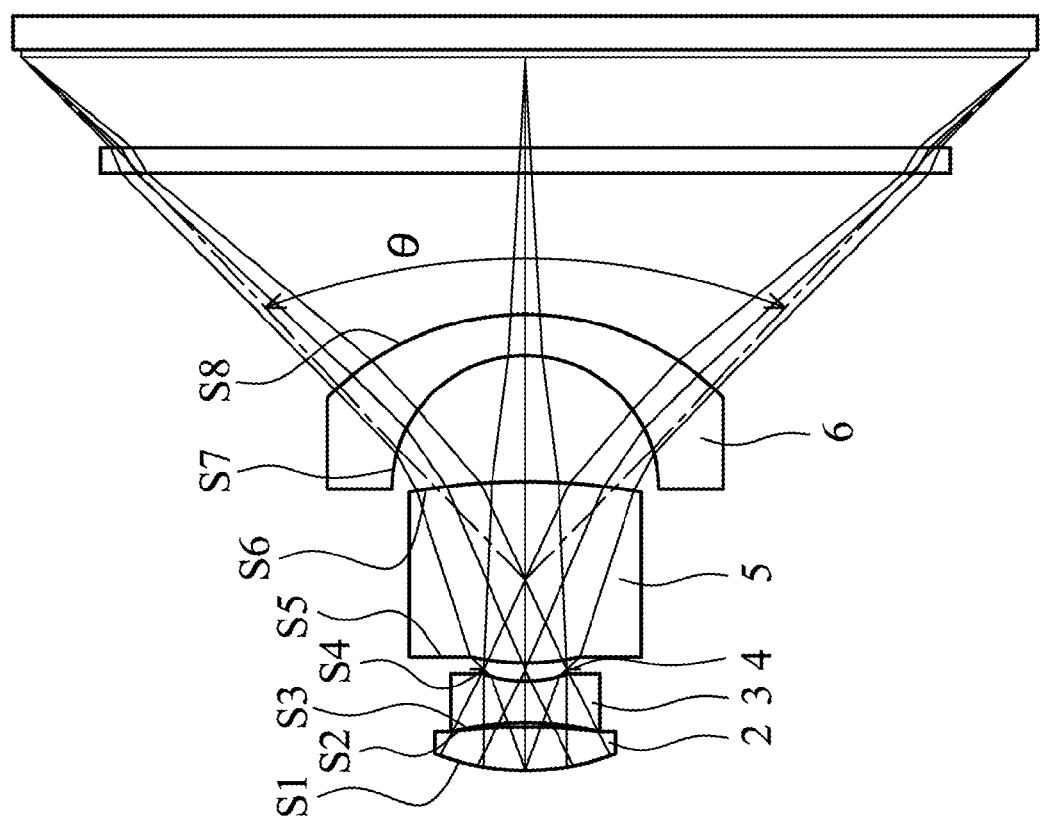
FIG. 5 is a perspective diagram of a lens module of a scanner according to a second embodiment of the invention.

Table 2-1 illustrates the design data of the lens module of a scanner in accordance with FIG. 5:

TABLE 2-1

| Surface | Radius of curvature (mm) | Thickness (mm) | Refraction index (Nd) | Abbe number (vd) |
|---|---|---|---|---|
| S1 | 0.4709 | 0.0692 | 1.6691 | 55.4183 |
| S2 | −1.7122 | 0.0053 | | |
| S3 | −0.7509 | 0.0806 | 1.6477 | 33.7928 |
| S4 | 0.6575 | 0.012 | | |
| Aperture stop | | 0.0178 | | |
| S5 | 0.7486 | 0.3176 | 1.7725 | 49.5984 |
| S6 | −1.07 | 0.2255 | | |
| S7 | −0.2476 | 0.0732 | 1.5407 | 47.2271 |
| S8 | −0.7062 | 0.249 | | |

In this embodiment, the lens module has a system focal length f=1 mm, the first lens 2 has a focal length f1=0.6243 mm, the fourth lens 6 has a focal length f4=−0.6535 mm, and the objective side surface S7 of the fourth lens 6 has a radius of curvature R7=−0.2476 mm, satisfying the conditions (1) and (2), wherein the viewing angle θ is 87.28 degrees.

Table 2-2 illustrates the design data of the first and fourth aspheric lenses 2 and 6 in accordance with FIG. 5:

TABLE 1-2

| Surface | k | A | B | C | D | E | F | G |
|---|---|---|---|---|---|---|---|---|
| S1 | 2.433773 | −2.2327 | −57.7025 | 3633.602 | −156924 | 3736347 | −4.6E+07 | 2.36E+08 |
| S2 | −7.86902 | −0.75955 | −105.755 | 21279.77 | −1580334 | 81786587 | −3.4E+09 | 7.99E+10 |
| S7 | −1.32484 | 6.398447 | −248.263 | 3842.722 | −80017.5 | 1188408 | −1.2E+07 | 49466170 |
| S8 | −4.23648 | 6.152477 | −59.7664 | −216.965 | 1568.939 | −21113.6 | 90253.07 | −140577 |

TABLE 1-2

| Surface | k | A | B | C | D | E | F | G |
|---|---|---|---|---|---|---|---|---|
| S1 | 0 | −4.64822 | −62.3516 | 301.8871 | 35514.6 | 0 | 0 | 0 |
| S2 | 0 | −7.31876 | 45.06084 | −456.386 | −19010.1 | 0 | 0 | 0 |
| S7 | 0 | −11.6479 | 36.94115 | −1830.67 | 117423.5 | −554115 | −4.5E+07 | 5.92E+08 |
| S8 | 0 | −8.94015 | 75.04427 | −107.536 | −2081.12 | −11460.2 | 273279.6 | −970782 |

Third Embodiment

Figure 6:
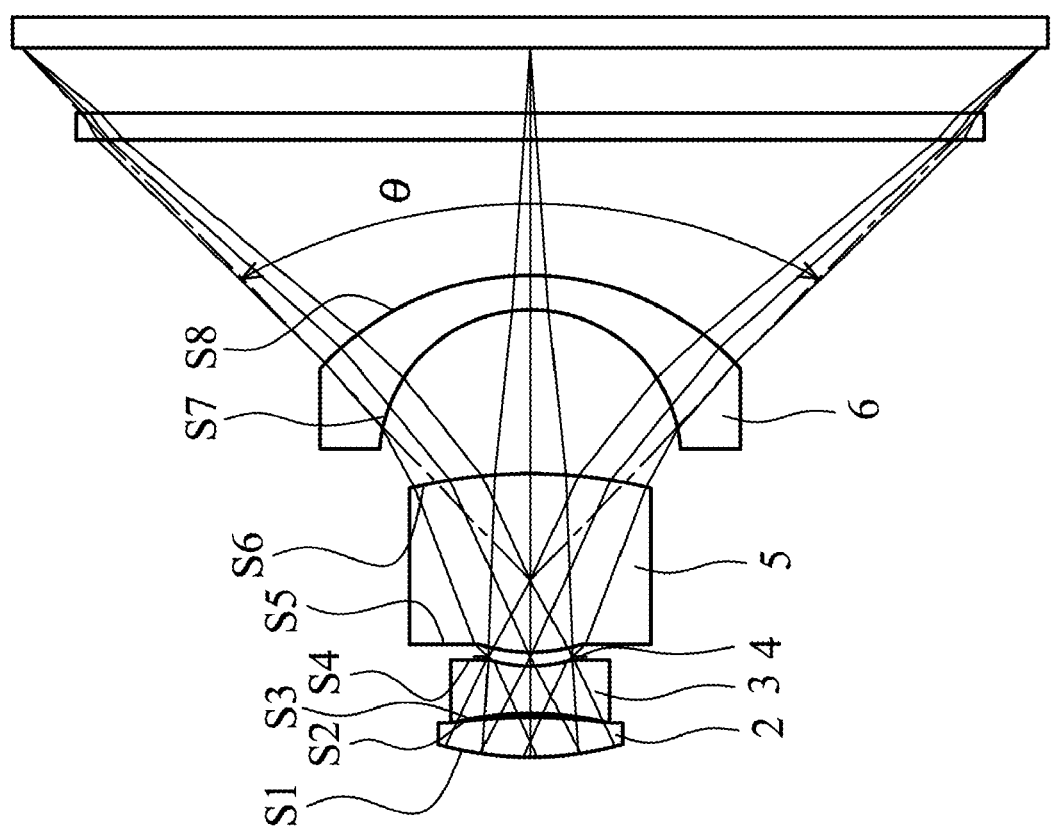
FIG. 6 is a perspective diagram of a lens module of a scanner according to a third embodiment of the invention.

Table 3-1 illustrates the design data of the lens module of a scanner in accordance with FIG. 6:

TABLE 3-1

| Surface | Radius of curvature (mm) | Thickness (mm) | Refraction index (Nd) | Abbe number (vd) |
|---|---|---|---|---|
| S1 | 0.4439 | 0.0706 | 1.6691 | 55.4183 |
| S2 | −2.1998 | 0.0052 | | |
| S3 | −0.9247 | 0.0912 | 1.6477 | 33.7928 |
| S4 | 0.4949 | 0.012 | | |
| Aperture stop | | 0.018 | | |
| S5 | 0.8286 | 0.3126 | 1.7725 | 49.5984 |
| S6 | −0.9472 | 0.3017 | | |
| S7 | −0.2078 | 0.0579 | 1.5407 | 47.2271 |
| S8 | −0.4035 | 0.249 | | |

In this embodiment, the lens module has a system focal length f=1 mm, the first lens 2 has a focal length f1=0.5559 mm, the fourth lens 6 has a focal length f4=−0.7423 mm, and the objective side surface S7 of the fourth lens 6 has a radius of curvature R7=−0.2078 mm, satisfying the conditions (1) and (2), wherein the viewing angle θ is 87.92 degrees. According to the first, second and third embodiments, the viewing angle θ increases with the decrease of the focal length f1 of the first lens 2 and the increase of the focal length f4 of the fourth lens 6.

Table 3-2 illustrates the design data of the first and fourth aspheric lenses 2 and 6 in accordance with FIG. 6:

TABLE 3-2

| Surface | k | A | B | C | D | E | F | G |
|---|---|---|---|---|---|---|---|---|
| S1 | 1.247433 | −5.10855 | −52.22 | −848.06 | −4118.9 | 0 | 0 | 0 |
| S2 | −59.3333 | −5.37631 | 48.35064 | −1416.62 | 17458.27 | 0 | 0 | 0 |
| S7 | −0.49138 | 2.143775 | −118.226 | 3637.865 | −39917.3 | 905734.6 | −1.8E+07 | 1.24E+08 |
| S8 | −5.68363 | −8.36629 | 52.43218 | −129.312 | 2683 | −19101.5 | 226118.6 | −507593 |

Since the first, second, third, and fourth lenses 2, 3, 5, and 6 satisfy the conditions (1) and (2), wider viewing angle θ and shorter total track length can be achieved. Additionally, since the first and fourth lenses 2 and 6 are aspheric lenses, distortion and curvature of an image field can be efficiently suppressed.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A lens module of a scanner, comprising:

a first lens with a positive diopter;

a second lens with a negative diopter;

a third lens with a positive diopter;

a fourth lens with a negative diopter, wherein the first, second, third, and fourth lenses are sequentially arranged from an object end to an image end of the lens module, at least one of the first and fourth lenses is an aspheric lens, and the fourth lens has a focal length f4 and an objective side surface with a radius of curvature R7, wherein $0.1 < R7/f4 < 1$.

2. The lens module as claimed in claim 1, wherein the first and fourth lenses are aspheric lenses.

3. The lens module as claimed in claim 2, wherein the first lens has a focal length f1, and the lens module has a system focal length f, wherein $0.2 < f1/f < 1$.

4. The lens module as claimed in claim 3, wherein the lens module further comprises an aperture stop disposed between the second and third lenses.

5. The lens module as claimed in claim 4, wherein the first, second, third, fourth lenses, and the aperture stop are arranged with a lower limited viewing angle of 80 degrees.

* * * * *